United States Patent
Yajima (10) Patent No.: US 10,363,759 B2
(45) Date of Patent: Jul. 30, 2019

(54) CUTTING MECHANISM AND RECORDING APPARATUS

(71) Applicant: SEIKO EPSON CORPORATION, Tokyo (JP)

(72) Inventor: Yasushi Yajima, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/915,725

(22) Filed: Mar. 8, 2018

(65) Prior Publication Data

US 2018/0272761 A1    Sep. 27, 2018

(30) Foreign Application Priority Data

Mar. 24, 2017   (JP) ................. 2017-059257

(51) Int. Cl.
| | |
|---|---|
| *B41J 11/70* | (2006.01) |
| *B65H 35/00* | (2006.01) |
| *B65H 20/02* | (2006.01) |
| *B65H 35/06* | (2006.01) |
| *B26D 1/18* | (2006.01) |
| *B26D 1/24* | (2006.01) |
| *B26D 5/08* | (2006.01) |
| *F16H 19/04* | (2006.01) |

(52) U.S. Cl.
CPC ............ *B41J 11/706* (2013.01); *B26D 1/185* (2013.01); *B26D 1/245* (2013.01); *B26D 5/083* (2013.01); *B65H 20/02* (2013.01); *B65H 35/0086* (2013.01); *B65H 35/06* (2013.01); *B65H 2301/51512* (2013.01); *B65H 2301/515323* (2013.01); *B65H 2403/41* (2013.01); *B65H 2801/06* (2013.01); *B65H 2801/12* (2013.01); *F16H 19/04* (2013.01)

(58) Field of Classification Search
CPC ........ B41J 11/706; B41J 11/703; B41J 11/70; B41J 11/66; B26D 5/083; B26D 5/08; B26D 2001/0013; B26D 1/045; B26D 1/06; B26D 5/065; B65H 35/06; B65H 20/02; B65H 35/0086; F16H 19/04

See application file for complete search history.

(56) References Cited

U.S. PATENT DOCUMENTS

2012/0297945 A1*  11/2012  Cordero ............... B26D 1/245
                                                              83/56
2016/0067987 A1    3/2016   Ohashi et al.

FOREIGN PATENT DOCUMENTS

| JP | 09-057687 A    | 3/1997 |
| JP | 2005-066755 A  | 3/2005 |
| JP | 2016-055379 A  | 4/2016 |

* cited by examiner

*Primary Examiner* — Henok D Legesse
(74) *Attorney, Agent, or Firm* — Workman Nydegger (57) ABSTRACT

There is provided a cutting mechanism including: a cutter blade that can cut a medium, a cutter unit to which the cutter blade is attached, a first pinion gear that is rotatably attached to the cutter unit, and a rack gear that can mesh with the first pinion gear, in which the first pinion gear and the rack gear are configured with inclined teeth, and the cutter unit moves while the pinion gear is rotated in state of meshing the pinion gear and the rack gear.

13 Claims, 7 Drawing Sheets

CUTTING MECHANISM AND RECORDING APPARATUS

BACKGROUND

1. Technical Field

The present invention relates to a cutting mechanism for cutting a medium and a recording apparatus including the cutting mechanism.

2. Related Art

As an example of a recording apparatus, there is a printer including a cutting mechanism which cuts a medium on which images such as characters, photographs, or the like are recorded to a desired size. JP-A-2005-66755 describes a cutter mechanism which cuts a roll paper by a cutter carriage having a rotary blade moving along a guide shaft as an example of a cutting mechanism.

In the cutter mechanism described in JP-A-2005-66755, for example, according to an accuracy of assembling the cutter carriage and the guide shaft, there is a possibility that rattling of the cutter carriage is generated when the cutter carriage moves along the guide axis. If the cutter carriage rattles, there is a fear that the medium cannot be cut with accuracy.

SUMMARY

An advantage of some aspects of the invention is to provide a cutting mechanism which can accurately cut a medium and a recording apparatus including the cutting mechanism.

Hereinafter, means and operation effects of the invention will be described.

According to an aspect of the invention, there is provided a cutting mechanism including: a cutter blade that is capable of cutting a medium, a cutter unit to which the cutter blade is attached, a pinion gear that is rotatably attached to the cutter unit, and a rack gear that is capable of meshing with the pinion gear, in which the pinion gear and the rack gear are configured with inclined teeth, and the cutter unit moves while the pinion gear is rotated in state of meshing the pinion gear and the rack gear.

According to the configuration, since the pinion gear and the rack gear are configured with the inclined teeth when the pinion gear is rotated with respect to the rack gear, a thrust force along the rotation shaft is generated in the pinion gear. When the cutter unit moves along the rack gear while rotating the pinion gear, since the cutter unit is pressed in a predetermined direction by the thrust force, the cutter unit can move in a state where a posture thereof is stabilized. Therefore, the medium can be accurately cut.

In the cutting mechanism, it is preferable that the cutter blade be rotatably attached to the cutter unit and be rotated as the pinion gear is rotated.

According to the configuration, it is likely to cut the medium by rotating the cutter blade.

In the cutting mechanism, it is preferable that a relay gear that transmits the rotation of the pinion gear to the cutter blade be provided.

According to the configuration, by providing the relay gear, a freedom degree of disposition of the cutter blade and the pinion gear can be improved.

In the cutting mechanism, it is preferable that a plurality of the pinion gears be provided in the cutter unit.

According to the configuration, since the thrust force for pressing the cutter unit is further increased, the posture of the cutter unit can be more stabilized.

In addition, according to another aspect of the invention, there is provided a recording apparatus including a recording unit that records an image on a medium; and the cutting mechanism described above.

According to the configuration, the same effect as the cutting mechanism described above can be obtained.

In the recording apparatus, it is preferable that a transport unit that transports the medium in a transport direction be provided, in which the pinion gear and the rack gear are configured with inclined teeth so that the cutter unit is pressed toward an upstream side in the transport direction when the cutter unit moves along the rack gear while rotating the pinion gear so as to cut the medium.

According to the configuration, the posture of the cutter unit can be stabilized.

In the recording apparatus, it is preferable that a transport unit that transports the medium in a transport direction be provided, in which the pinion gear and the rack gear are configured with inclined teeth so that the cutter unit is pressed toward a downstream side in the transport direction when the cutter unit moves toward a home position along the rack gear after the medium is cut.

According to the configuration, when the cutter unit returns to the home position, a fear of cutting the cut medium again can be reduced.

In the recording apparatus, it is preferable that the recording unit have a moving unit and the cutter unit be configured to be movable according to the movement of the moving unit.

According to the configuration, a motor or the like for moving the cutter unit becomes unnecessary.

Therefore, the configuration thereof can be simplified.

In the recording apparatus, it is preferable that a driving unit be provided for moving the cutter unit along the rack gear.

According to the configuration, a mechanism for moving the cutter unit can be likely to be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of a recording apparatus having a cutting mechanism will be described with reference to the drawings.

Figure 1:
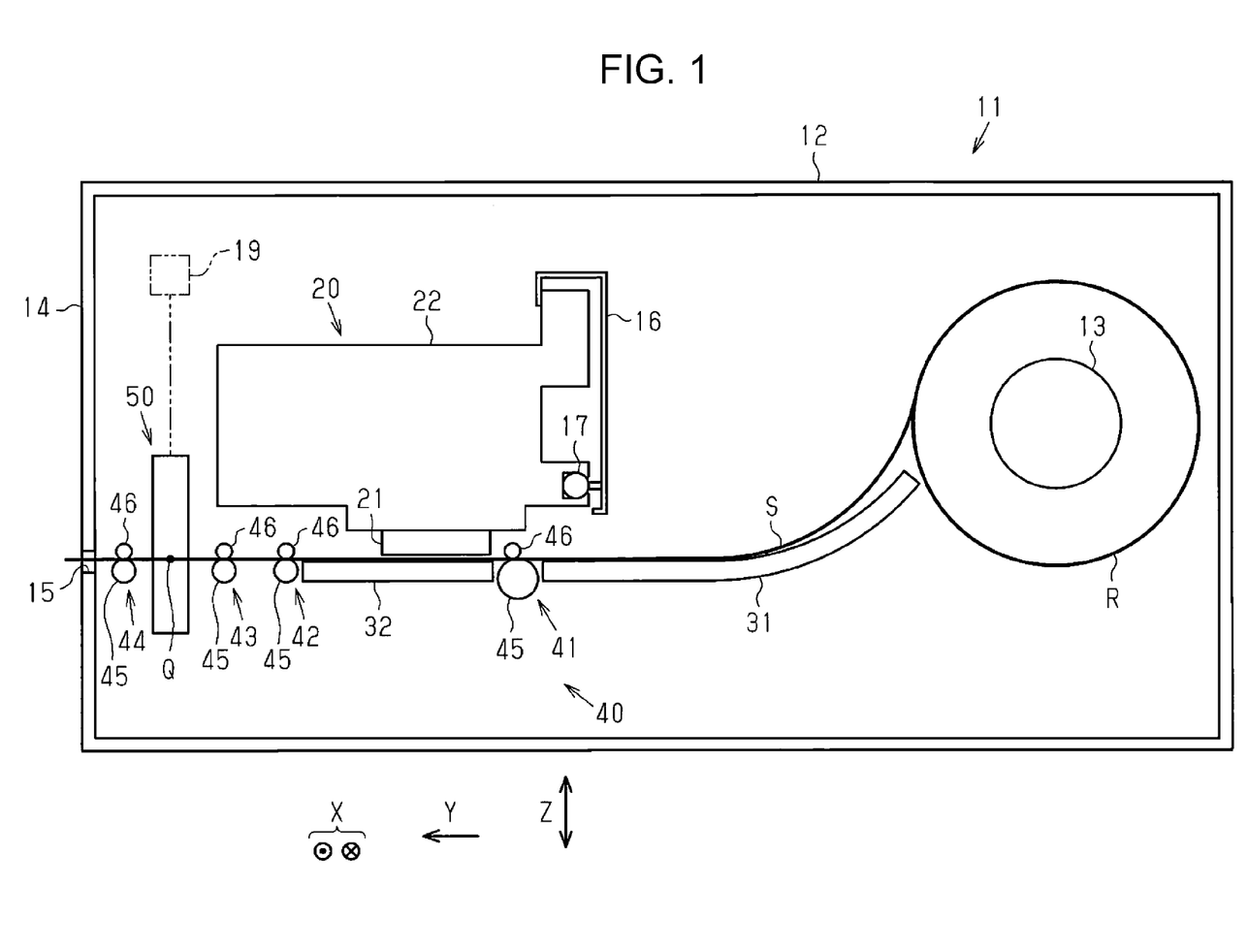
FIG. 1 is a side view schematically illustrating an internal structure of an embodiment of a recording apparatus having a cutting mechanism.

As illustrated in FIG. 1, the recording apparatus 11 has a rectangular parallelepiped housing 12. The recording apparatus 11 includes a recording unit 20 that records images such as characters and photographs on the medium S and a first support member 31 and a second support member 32 that support the medium S in the housing 12. The recording apparatus 11 includes a transport unit 40 which transports the medium S and a cutting mechanism 50 which cuts the medium S recorded by the recording unit 20 in the housing 12. In other words, the recording unit 20, the first and second support members 31 and 32, the transport unit 40, and the cutting mechanism 50 are accommodated in the housing 12.

In the housing 12, for example, a roll body R on which a medium S as a sheet is wound in a roll form is disposed. The roll body R is disposed behind an inside of the housing 12 which is on the right side in FIG. 1. The roll body R is rotatably supported by a shaft 13 provided so as to extend in a width direction X of the medium S. In this embodiment, as the shaft 13 is rotated in the counterclockwise direction in FIG. 1, the medium S is unwound from the roll body R. The unwound medium S is transported by the transport unit 40 and discharged from the inside of the housing 12 to the outside of the housing 12 through a discharge port 15 opening on the front surface 14 of the housing 12. In other words, in this embodiment, the direction from a rear side to a front side of the housing 12, the direction from a right side to a left side in FIG. 1 is the transport direction Y of the medium S transported by the transport unit 40. The front surface 14 of the housing 12 is a surface having a spread in the vertical direction Z and the width direction X.

The recording unit 20 includes a head 21 which ejects liquid such as ink, for example, toward the medium S and a carriage 22 which mounts the head 21. The carriage 22 is supported by a frame 16 which is provided in the housing 12 and a guide shaft 17 which is attached to the frame 16. The guide shaft 17 extends in the width direction X of the medium S. The carriage 22 is movable along the guide shaft 17. In other words, the carriage 22 is movable in the width direction X. In this embodiment, the carriage 22 functions as an example of a moving unit included in the recording unit 20. By moving the carriage 22 along the guide shaft 17, the head 21 can eject liquid onto the medium S over the entire region in the width direction X.

The first and second support members 31 and 32 are formed of plate-like members. The first support member 31 is disposed on the upstream side of the second support member 32 in the transport direction Y and guides the medium S unwound from the roll body R toward the recording unit 20. The second support member 32 is disposed to face the head 21 of the recording unit 20.

The transport unit 40 transports the medium S unwound from the roll body R toward the discharge port 15 from the inside of the housing 12 so as to be along the first and second support members 31 and 32. The transport unit 40 has a first transport roller pair 41, a second transport roller pair 42, a third transport roller pair 43, and a fourth transport roller pair 44 in order from the upstream side to the downstream side in the transport direction Y. The first transport roller pair 41 is disposed on the upstream side of the head 21 in the transport direction Y and is disposed at a position between the first support member 31 and the second support member 32. The second, third, and fourth transport roller pairs 42, 43, and 44 are disposed on the downstream side of the head 21 in the transport direction Y.

The first, second, third, and fourth transport roller pairs 41, 42, 43, and 44 include a driving roller 45 which can be driven and rotated by a motor (not illustrated), a driven roller 46 which can be driven and rotated with respect to the rotation of the driving roller 45. The first, second, third, and fourth transport roller pairs 41, 42, 43, and 44 transport the medium S by rotating in a state of interposing the medium S between the driving roller 45 and the driven roller 46. The driving roller 45 is disposed so as to contact the medium S from below. The driven roller 46 is disposed so as to be in contact with the medium S from above. In other words, the driven roller 46 in the second, third, and fourth transport roller pairs 42, 43, and 44 are in contact with a surface onto which the liquid is ejected with respect to the medium S when the medium S is transported. Therefore, so as to reduce the deterioration of the quality of the image recorded on the medium S, the driven rollers 46 in the second, third, and fourth transport roller pairs 42, 43, and 44 are configured with star wheels or the like which have a small contact area with respect to the medium S. A plurality of first, second, third, and fourth transport roller pairs 41, 42, 43, and 44 are disposed at predetermined intervals in the width direction X, respectively.

The cutting mechanism 50 is disposed between the third transport roller pair 43 and the fourth transport roller pair 44 in the transport direction Y. The medium S cut by the cutting mechanism 50 is transported by the fourth transport roller pair 44 and discharged from the discharge port 15. The recording apparatus 11 according to this embodiment is configured such that the interval in the vertical direction Z at the opening of the discharge port 15 is relatively small to the extent that the user cannot insert the hand into the housing 12 from the discharge port 15.

The recording apparatus 11 in this embodiment is normally used in a state of being installed on a horizontally spreading floor surface. The housing 12 of the recording apparatus 11 is provided in a rectangular parallelepiped shape such that the front surface 14 thereof crosses the floor surface and ideally is orthogonal to the floor surface. At this time, an orthogonal coordinate system including three axes of X axis, Y axis, and Z axis is considered, the floor surface on which the recording apparatus 11 is installed is a plane including the X-axis and the Y-axis, and a coordinate system is set so that the front surface 14 of the housing 12 becomes a plane including an X-axis and a Z-axis. Then, the width direction X coincides with the direction in which the X-axis extends, the transport direction Y coincides with the direction in which the Y-axis extends, and the vertical direction Z coincides with the direction in which the Z-axis extends. The X-axis extending in the width direction X, the Y-axis extending in the transport direction Y, and the Z-axis extending in the vertical direction Z have a relationship of being orthogonal to each other. In other words, in this embodiment, the width direction X, the transport direction Y, and the vertical direction Z respectively indicate three different directions from each other.

Next, the cutting mechanism 50 will be described.

Figure 2:
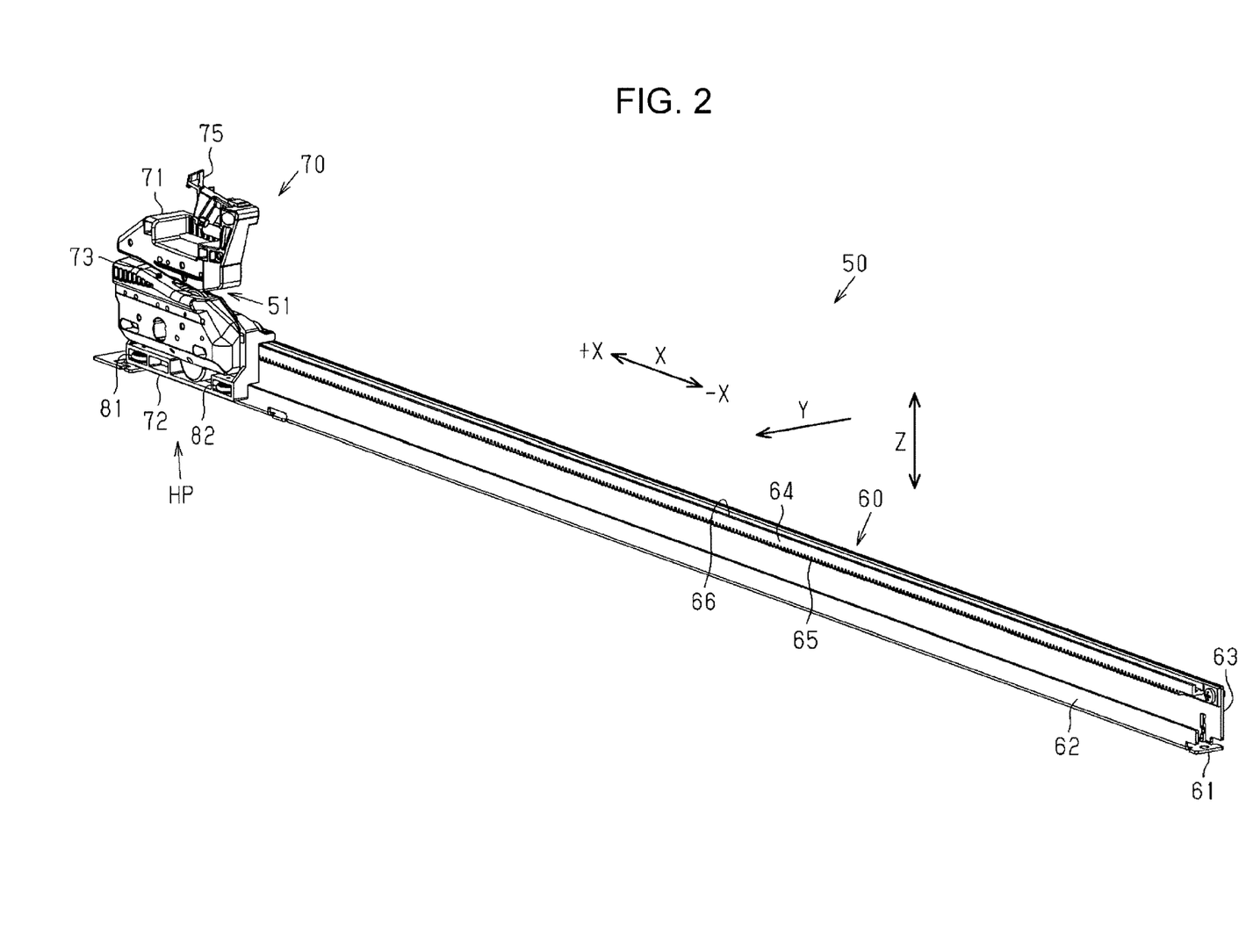
FIG. 2 is a perspective view of the cutting mechanism.

As illustrated in FIG. 2, the cutting mechanism 50 has a cutter blade 51 for cutting the medium S, a cutter unit 70 to which the cutter blade 51 is attached, and a guide frame 60 which supports the cutter unit 70. The guide frame 60 extends in the width direction X so as to be longer than the roll body R that can be loaded by the recording apparatus 11. In other words, the longitudinal direction of the guide frame 60 coincides with the width direction X. The cutter unit 70 can reciprocate along the guide frame 60. The cutting mechanism 50 cuts the medium S by the cutter blade 51 as the cutter unit 70 moves along the guide frame 60. For convenience of explanation, in the width direction X, the left side in FIG. 2 is set as the +X side and the right side as the opposite side thereto is set to the −X side. In this embodiment, as illustrated in FIG. 2, in the guide frame 60, the end portion on the +X side in the width direction X is set as the home position HP of the cutter unit 70.

The guide frame 60 is formed by bending a sheet metal. The guide frame 60 is formed in a claw-like shape when viewed from the width direction X. The guide frame 60 has a bottom wall 61 and a front wall 62 and a rear wall 63 which bend upward from the bottom wall 61 and extend. The front wall 62 is located on the downstream side of the rear wall 63 in the transport direction Y and extends from the bottom wall 61 so that its length is shorter than the rear wall 63 in the vertical direction Z.

The guide frame 60 has a rack gear 64 extending in the width direction X. The rack gear 64 is attached to a surface of the rear wall 63 of the guide frame 60 which is on the downstream side in the transport direction Y. The rack gear 64 is disposed along an upper edge of the rear wall 63 and is provided so that the length in the width direction X is slightly shorter than the guide frame 60. The rack gear 64 has a tooth 65 over the width direction X at a portion on the lower side thereof. The rack gear 64 has a groove 66 in the width direction X for guiding the movement of the cutter unit 70 in a portion on the upper side thereof.

Figure 3:
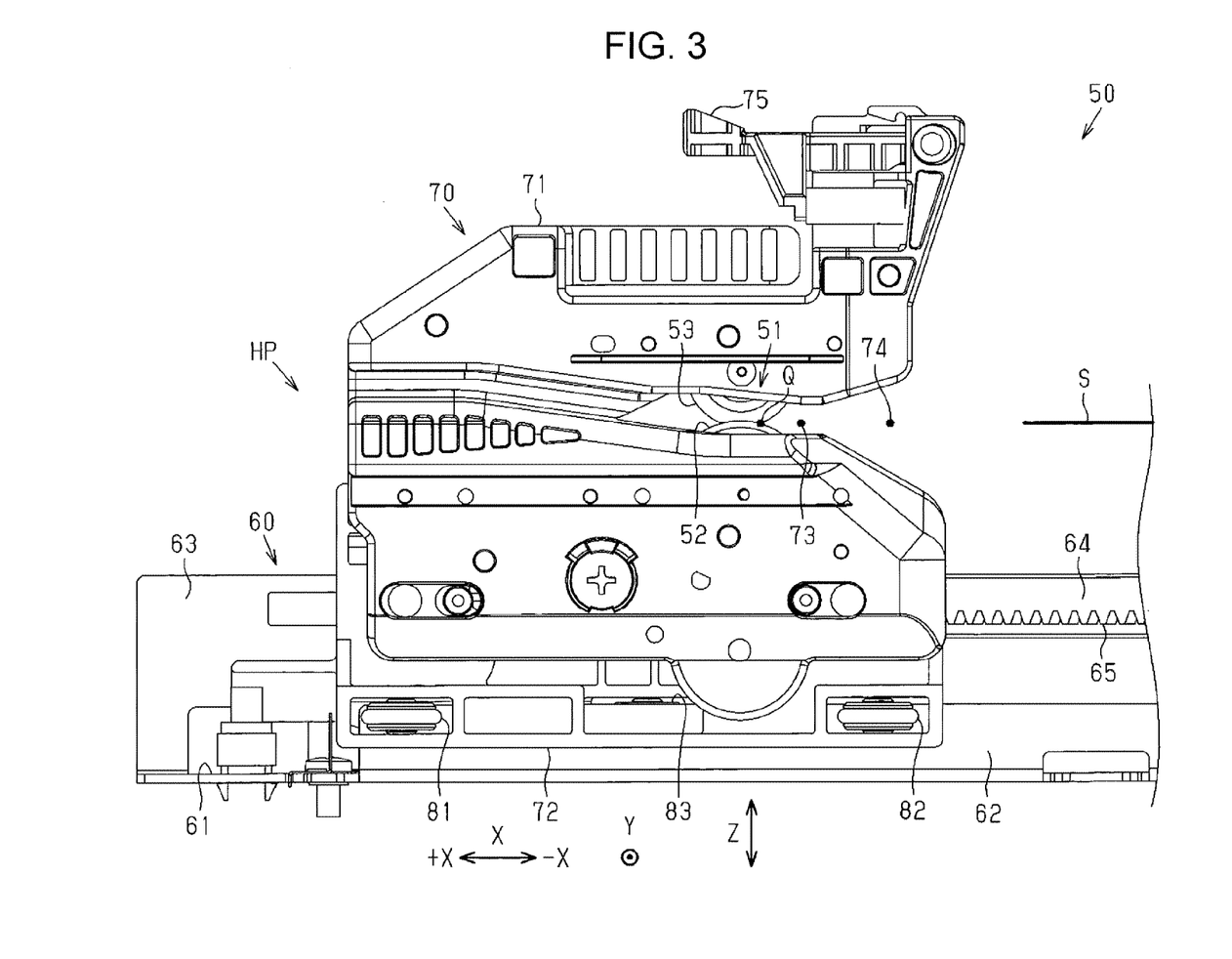
FIG. 3 is a front view of the cutting mechanism.

As illustrated in FIG. 2 and FIG. 3, the cutter unit 70 has a holding body 71 which holds the cutter blade 51 and a moving body 72 which is held on the guide frame 60. The cutter unit 70 illustrated in FIGS. 2 and 3 is located at the home position HP. The holding body 71 and the moving body 72 are fixed to each other so as to be capable of being handled integrally. The holding body 71 and the moving body 72 are fixed so that the portions thereof are overlapped with each other when viewed from the transport direction Y. Specifically, the holding body 71 and the moving body 72 are disposed so that the lower portion of the holding body 71 and the upper portion of the moving body 72 overlap each other in the vertical direction Z.

The holding body 71 is attached to a surface of the moving body 72 on the downstream side in the transport direction Y. The holding body 71 has a medium path 73 extending in the width direction X at a position above the moving body 72 in the vertical direction Z. The medium path 73 is a path through which the medium S passes through the holding body 71 when the cutter unit 70 moves in the width direction X along the guide frame 60. The portion of the medium path 73 on the −X side in the width direction X is an introduction port 74 for introducing the medium S into the medium path 73. So as to facilitate the introduction of the medium S into the medium path 73, the introduction port 74 is configured so that the opening in the vertical direction Z gradually increases from the +X side to the −X side in the width direction X.

The holding body 71 holds the cutter blade 51 at a position in the medium path 73 in the middle thereof. In other words, when the cutter unit 70 moves in the width direction X, the medium path 73 guides the medium S toward the cutter blade 51. The cutter blade 51 is disposed on the +X side of the introduction port 74 in the width direction X and is positioned adjacent to the introduction port 74. The cutter blade 51 is configured with a disk-shaped driving blade 52 and a driven blade 53. The driving blade 52 and the driven blade 53 are rotatably attached to the holding body 71. The driving blade 52 and the driven blade 53 are provided so as to be lined up in the vertical direction Z and disposed so as to interpose the medium path 73 therebetween. The driving blade 52 is positioned below the driven blade 53 in the vertical direction Z and is positioned on the downstream side of the driven blade 53 in the transport direction Y.

The cutter blade 51 is held by the holding body 71 in a state where the cutting edge which is the upper portion of the driving blade 52 and the cutting edge which is a lower side portion of the driven blade 53 are overlapped with each other when viewed from the transport direction Y. The cutting edge of the driving blade 52 and the cutting edge of the driven blade 53 are in contact with each other at a cutting position Q which is a position closer to the −X side in the width direction X among a portion in which the cutting edges overlap each other. The driving blade 52 in this embodiment is held by the holding body 71 in a posture in which the rotation shaft thereof is inclined by a predetermined angle with respect to the driven blade 53 extending in the transport direction Y. The cutter blade 51 cuts the medium S at the cutting position Q where the cutting edges of the driving blade 52 and the driven blade 53 are in contact with each other as the driving blade 52 and the driven blade 53 are rotated. In other words, when the cutter unit 70 moves from the +X side to the −X side in the width direction X, the cutting mechanism 50 interposes the medium S passing through the medium path 73 between the rotating driving blade 52 and the driven blade 53 and cut the medium S. The cutting mechanism 50 in this embodiment returns to the home position HP by moving from the −X side to the +X side after cutting the medium S by moving from the +X side to the −X side in the width direction X.

The holding body 71 has a lever 75 on an upper portion thereof for connecting the carriage 22 of the recording unit 20 and the cutter unit 70. The lever 75 is engageable with an engaging portion (not illustrated) provided on the carriage 22, for example, a claw extending from the carriage 22. In other words, by connecting the cutter unit 70 to the carriage 22 via the lever 75, the cutter unit 70 can move in the width direction X according to the movement of the carriage 22. The lever 75 is configured to be switchable between an engaged state in which the lever engages with the engaging portion and an unengaged state in which the lever is not engaged with the engaging portion by an actuator, a motor, or the like. In this embodiment, for example, when the recording unit 20 records on the medium S, the lever 75 is in the unengaged state and when the cutting mechanism 50 cuts the medium S, the lever 75 is in the engaged state. When the lever 75 is in the unengaged state, the cutter unit 70 does not move according to the movement of the carriage 22 and when the lever 75 is in the engaged state, the cutter unit 70 moves according to the movement of the carriage 22.

Figure 4:
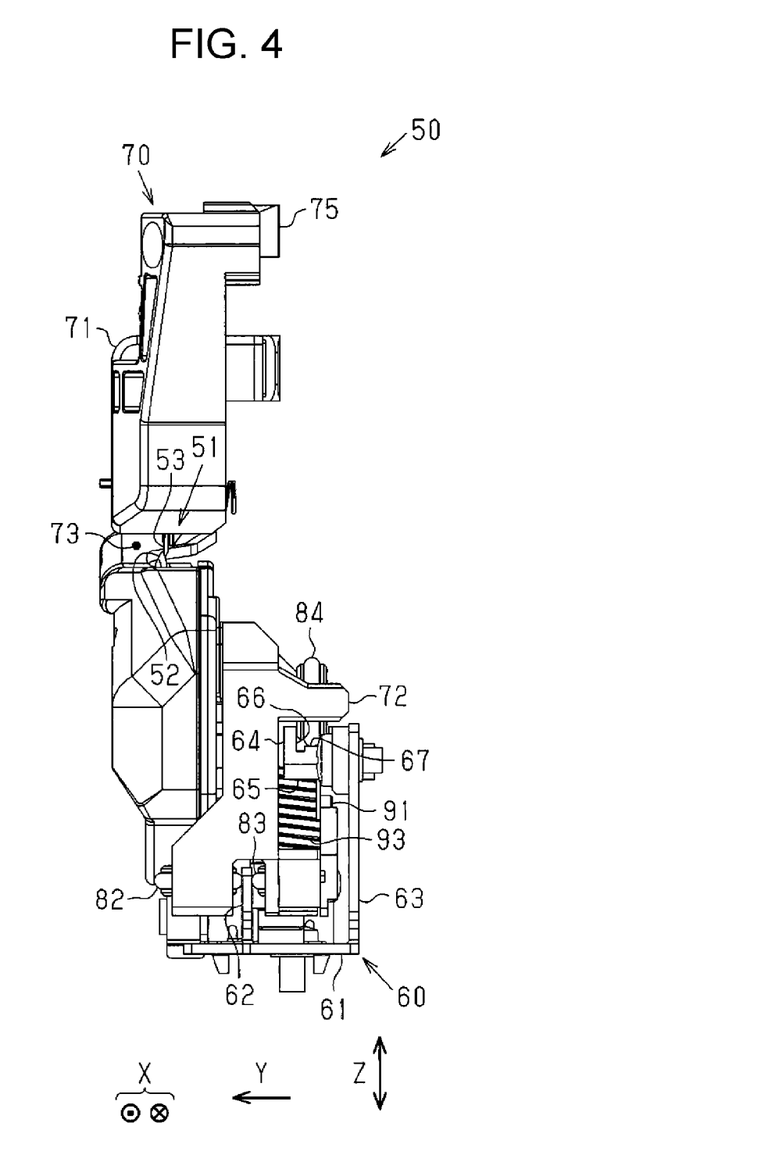
FIG. 4 is a side view of a cutting mechanism.

As illustrated in FIGS. 3 and 4, the moving body 72 has a first roller 81, a second roller 82, and a third roller 83 disposed to interpose the front wall 62 of the guide frame 60 at the lower portion thereof. The first and second rollers 81 and 82 are disposed on the front wall 62 so that peripheral surfaces thereof are in contact with a surface on the downstream side in the transport direction Y. The third roller 83 is disposed on the front wall 62 so that peripheral surface thereof is in contact with a surface on the upstream side in the transport direction Y. The first roller 81 is located at an end portion of the moving body 72 which is on the +X side in the width direction X and the second roller 82 is located at an end portion of the moving body 72 which is on the −X side in the width direction X. The third roller 83 is located between the first roller 81 and the second roller 82 in the width direction X. The first, second, and third rollers 81, 82, and 83 have rotation shafts thereof extending in the vertical direction Z and are rotated due to friction with the front wall 62 when the moving body 72 moves in the width direction X. In other words, the first, second and third rollers 81, 82, and 83 guide the movement of the cutter unit 70 along the front wall 62.

Figure 5:
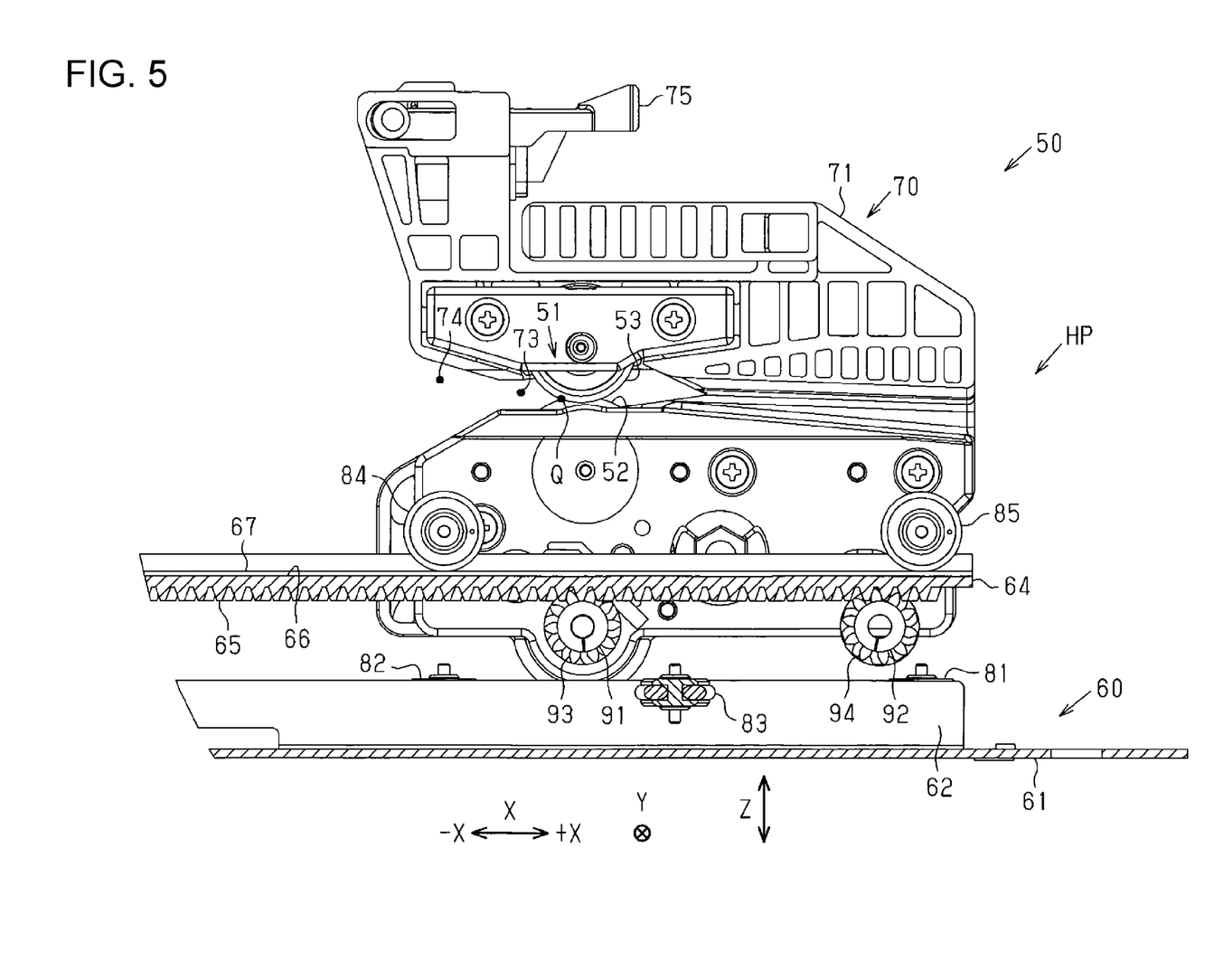
FIG. 5 is a cross-sectional view of a cutting mechanism.

As illustrated in FIGS. 4 and 5, the moving body 72 has a fourth roller 84 and a fifth roller 85 disposed on an upper portion thereof so that a portion thereof fits in the groove 66 of the rack gear 64. The fourth and fifth rollers 84 and 85 are disposed such that their peripheral surfaces are in contact with the bottom surface 67 of the groove 66. The fourth roller 84 is located at the end portion on the −X side in the width direction X in the moving body 72 and the fifth roller 85 is located at the end portion on the +X side in the width direction X. In other words, the fourth roller 84 is positioned above the second roller 82, and the fifth roller 85 is positioned above the first roller 81. The fourth and fifth rollers 84 and 85 are rotated by friction with the bottom surface 67 of the groove 66 when the rotating shaft extends in the transport direction Y and the moving body 72 moves in the width direction X. In other words, the fourth and fifth rollers 84 and 85 guide the movement of the cutter unit 70 along the groove 66 of the rack gear 64. In summary, the first, second, third, fourth and fifth rollers 81, 82, 83, 84, and 85 guide the movement of the cutter unit 70 along the guide frame 60.

The moving body 72 has a first pinion gear 91 and a second pinion gear 92 that can mesh with the teeth 65 of the rack gear 64. In other words, the cutter unit 70 has a plurality of pinion gears. The first and second pinion gears 91 and 92 are rotatably attached to the moving body 72. The first and second pinion gears 91 and 92 have teeth 93 and 94 on the peripheral surfaces thereof and are disposed at interval in the width direction X. The first pinion gear 91 is disposed on the −X side with respect to the second pinion gear 92 in the width direction X. When the cutter unit 70 moves along the guide frame 60, the first and second pinion gears 91 and 92 are rotated while meshing with the rack gear 64.

Figure 6:
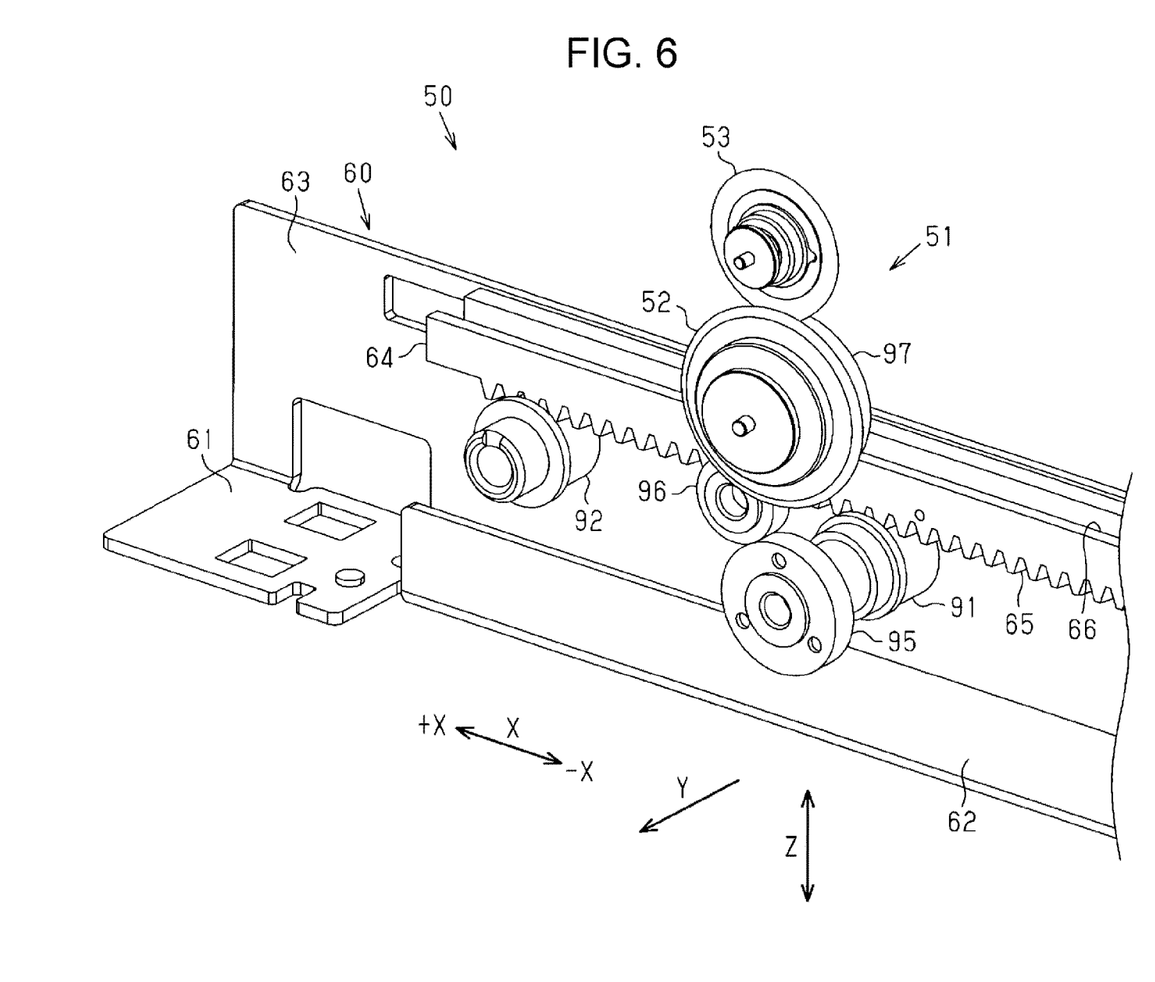
FIG. 6 is a perspective view illustrating a relay gear.

As illustrated in FIG. 6, a first gear 95 is attached to the first pinion gear 91. The first gear 95 is disposed on the downstream side of the first pinion gear 91 in the transport direction Y. In FIG. 6, although the holding body 71 and the moving body 72 are not illustrated, the first gear 95 is a member of the holding body 71. In addition to the first gear 95, the holding body 71 has a second gear 96 and a third gear 97. The first gear 95 is disposed coaxially with the first pinion gear 91. In other words, the first gear 95 can be rotated in synchronization with the first pinion gear 91. The second gear 96 is disposed above the first gear 95 and provided so as to mesh with the first gear 95. In other words, the second gear 96 is rotatable in synchronization with the first gear 95. The third gear 97 is disposed above the second gear 96 and provided so as to mesh with the second gear 96. In other words, the third gear 97 is rotatable in synchronization with the second gear 96.

The third gear 97 is disposed coaxially with the driving blade 52 constituting the cutter blade 51. In other words, the driving blade 52 can be rotated in synchronization with the third gear 97. In summary, when the cutter unit 70 moves along the guide frame 60, the first pinion gear 91 is rotated while meshing with the rack gear 64 and thus the driving blade 52 is rotated. The driven blade 53 is driven to rotate by the rotation of the driving blade 52 as cutting edge thereof is in contact with the cutting edge of the driving blade 52. In short, the first, second and third gears 95, 96, and 97 function as relay gears for transmitting the rotation of the first pinion gear 91 to the driving blade 52 constituting the cutter blade 51.

Figure 7:
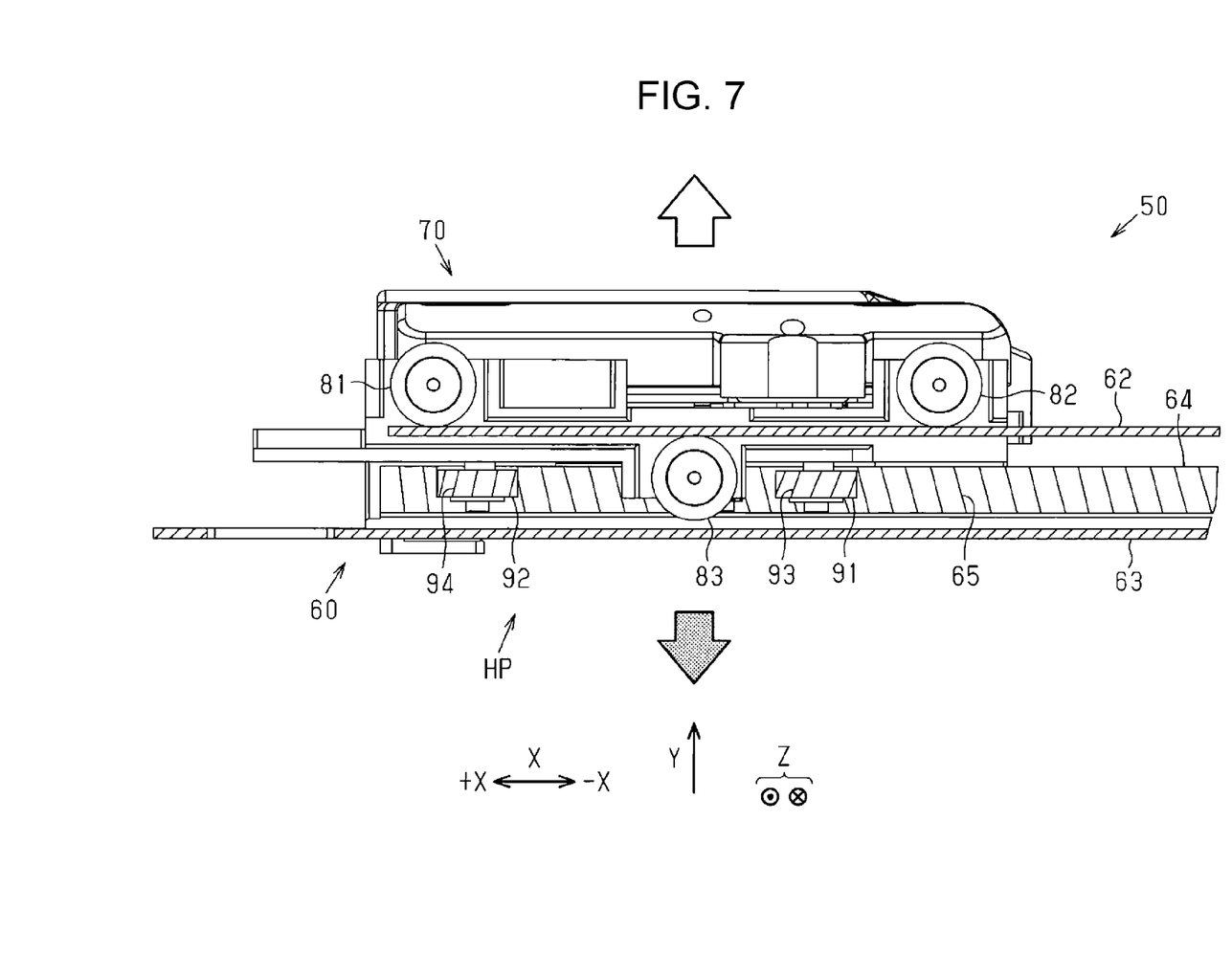
FIG. 7 is a sectional view of the cutting mechanism as viewed from below.

As illustrated in FIG. 7, in the first and second pinion gears 91 and 92, teeth 93 and 94 provided on the peripheral surfaces thereof are configured as inclined teeth extending obliquely with respect to the rotation shafts of the first and second pinion gears 91 and 92. In other words, the first and second pinion gears 91 and 92 are configured as so-called helical gears. The teeth 93 and 94 of the first and second pinion gears 91 and 92 extend obliquely from the +X side to the −X side in the width direction X as the teeth go from the upstream side to the downstream side in the transport direction Y when viewed from below in the vertical direction Z. In this embodiment, the first and second pinion gears 91 and 92 are configured so that their teeth 93 and 94 become right-handed when viewed from below in the vertical direction Z.

The rack gear 64 is configured as an inclined tooth extending obliquely so that teeth 65 thereof correspond to the teeth 93 and 94 of the first and second pinion gears 91 and 92. In other words, the rack gear 64 is configured as a so-called helical rack. When viewed from the lower side in the vertical direction Z, the teeth 65 of the rack gear 64 obliquely extend from the −X side to the +X side in the width direction X as the teeth go from the upstream side to the downstream side in the transport direction Y. In this embodiment, the rack gear 64 is configured so that teeth 65 thereof become left-handed when viewed from the lower side in the vertical direction Z so as to be capable of meshing with the first and second pinion gears 91 and 92.

Next, the operation of the recording apparatus 11 configured as described above will be described focusing particularly on a case where the cutting mechanism 50 cuts the medium S.

As illustrated in FIG. 7, when the cutting mechanism 50 cuts the medium S, the cutter unit 70 moves the +X side to the −X side in the width direction X from. As the cutter unit 70 moves along the guide frame 60, the first and second pinion gears 91 and 92 are rotated while teeth 93 and 94 thereof mesh with the teeth 65 of the rack gear 64. In other words, the cutter unit 70 moves along the guide frame 60 while rotating the first and second pinion gears 91 and 92 engaged with the rack gear 64. At this time, since the teeth 93, 94, and 65 are the inclined teeth, a thrust force corresponding to the tooth trace of the teeth 93, 94, 65 is generated at the first and second pinion gears 91 and 92 and the rack gear 64. This thrust force is generated in a direction along the rotation shafts of the first and second pinion gears 91 and 92, in the direction coincident with the transport direction Y in this embodiment. In other words, when moving along the rack gear 64, the cutter unit 70 is pressed in the transport direction Y by the first and second pinion gears 91 and 92 being rotated while meshing with the rack gear 64.

When the cutter unit 70 moves from the +X side to the −X side in the width direction X according to the movement of the carriage 22, since the teeth 93 and 94 of the first and second pinion gears 91 and 92 move while being pressed against inclined surfaces of the first and second pinion gears 91 and 92 on a side (here, +X side) opposite to the moving direction with respect to a mountain portion in the teeth 65 of the rack gear 64, a thrust force directed from the downstream side to the upstream side in the transport direction Y is generated in the first and second pinion gears 91 and 92 as indicated by a dotted arrow in FIG. 7. In other words, when the cutting mechanism 50 cuts the medium S, the cutter unit 70 moves while being pressed toward the upstream side in the transport direction Y by thrust force. Specifically, while the first and second rollers 81 and 82 are pressed against the front wall 62 of the guide frame 60, the cutter unit 70 moves in the width direction X.

When the cutter unit 70 moves from the −X side to the +X side in the width direction X accordance to the movement of the carriage 22, since the teeth 93 and 94 of the first and second pinion gears 91 and 92 move while being pressed against inclined surfaces of the first and second pinion gears 91 and 92 on a side (here, −X side) opposite to the moving direction with respect to a mountain portion in the teeth 65 of the rack gear 64, a thrust force directed from the upstream side to the downstream side in the transport direction Y is generated in the first and second pinion gears 91 and 92 as indicated by a outlined arrow in FIG. 7. In other words, when the cutter unit 70 moves toward the home position HP after the cutting mechanism 50 cuts the medium S, the cutter unit 70 moves while being pressed toward the downstream side in the transport direction Y by thrust force. Specifically, while the third roller 83 is pressed against the front wall 62 of the guide frame 60, the cutter unit 70 moves in the width direction X.

When the cutter unit 70 moves, a thrust force in a direction opposite to the thrust force generated in the first and second pinion gears 91 and 92 as a reaction is generated in the rack gear 64. However, since the guide frame 60 is fixed to the housing 12, the cutter unit 70 moves with respect to the guide frame 60.

In addition, the cutter unit 70 may cut the medium S while the first pinion gear 91 or the second pinion gear 92 is driven to move independently of the carriage 22. In this case, the teeth 93 of the first pinion gear 91 or the teeth 94 of the second pinion gear 92 move while meshing with the inclined surface of the first pinion gear 91 or the second pinion gear 92 on the moving direction side with respect to the mountain portion of the teeth 65 of the rack gear 64. Accordingly, a thrust force is generated in the direction opposite to the direction in a case where the cutter unit 70 is driven and moved according to the movement of the carriage 22. In other words, in a case where the first pinion gear 91 or the second pinion gear 92 is driven and thus the cutter unit 70 is moved, it is necessary to reverse the directions of the inclined teeth of the first and second pinion gears 91 and 92 and the rack gear 64. In addition, in the cutter unit 70, the first pinion gear 91 and the second pinion gear 92 may be driven to cut the medium S while moving independently of the carriage 22.

According to the embodiment described above, the following effects can be obtained.

(1) The first and second pinion gears 91, 92 and the rack gear 64 are configured as inclined teeth. Therefore, when the first and second pinion gears 91 and 92 are rotated with respect to the rack gear 64, a thrust force along the rotation shaft thereof is generated in the first and second pinion gears 91 and 92. When the cutter unit 70 moves along the rack gear 64 while rotating the first and second pinion gears 91 and 92, the cutter unit 70 is pressed against the rack gear 64 by this thrust force. Accordingly, the medium S is cut in a state where the posture of the cutter unit 70 is stabilized. Therefore, the medium S can be accurately cut.

(2) The cutter blade 51 is rotatably attached to the cutter unit 70 and is rotated as the first pinion gear 91 is rotated. By rotating the cutter blade 51, the medium S can be easily cut.

(3) The recording apparatus 11 includes a relay gear including first, second and third gears 95, 96, and 97 which transmit the rotation of the first pinion gear 91 to the cutter blade 51. Accordingly, a freedom degree of disposition in the cutter blade 51 and the first pinion gear 91 can be improved.

(4) A plurality of pinion gears including first and second pinion gears 91 and 92 are provided on the cutter unit 70. Therefore, the thrust force for pressing the cutter unit 70 is further increased and the posture of the cutter unit 70 can be further stabilized.

(5) The first and second pinion gears 91 and 92 and the rack gear 64 are configured with inclined teeth so as to press the cutter unit 70 toward the upstream side in the transport direction Y when cutting the medium S. Therefore, the posture of the cutter unit 70 can be stabilized.

(6) When the cutter unit 70 moves to the home position HP, the first and second pinion gears 91 and 92 and the rack gear 64 are configured with inclined teeth so as to press the cutter unit 70 toward the downstream side in the transport direction Y. Therefore, when the cutter unit 70 returns to the home position HP, a fear of cutting the cut medium S again can be reduced.

(7) The recording unit 20 has a carriage (moving unit) 22, and the cutter unit 70 is configured to be movable according to the movement of the carriage (moving unit) 22. In other words, a motor or the like for moving the cutter unit 70 becomes unnecessary. Therefore, the configuration of the cutter unit 70 can be simplified.

The embodiment described above may be modified as follows. In addition, the modified examples to be described below may be combined as appropriate.

As indicated by a two-dot chain line in FIG. 1, the recording apparatus 11 may additionally include a driving unit 19 for moving the cutter unit 70 in the width direction X.

According to the modification example, the following effects can be obtained.

(8) Since the recording apparatus 11 includes the driving unit 19 for moving the cutter unit 70 along the rack gear 64, a mechanism for moving the cutter unit 70 can be likely to be realized.

The home position HP of the cutter unit 70 may be provided at the end portion on the −X side in the width direction X.

In the cutter unit 70, the holding body 71 and the moving body 72 may be integrally provided.

The recording unit 20 may not have the carriage 22 as a moving unit. In this case, it is preferable to configure the head 21 as a line head which is lengthened in the width direction X.

The cutter blade 51 is not limited to a rotating blade but may be a fixed blade.

It may not include the first, second and third gears 95, 96, and 97 functioning as a relay gear. For example, the driving blade 52 may be configured to be directly connected to the first pinion gear 91 to rotate the driving blade 52 directly. In addition, the driving blade 52 may be rotated with a separate driving source.

A plurality of pinion gears may not be provided in the cutter unit 70. If the cutter unit 70 including at least one pinion gear, the posture of the cutter unit 70 can be stabilized.

The driving blade 52 may be configured to be rotated by rotating the second pinion gear 92.

The medium S is not limited to paper, but may be plastic film, metal film, cloth or the like.

The recording apparatus 11 may be a fluid ejecting apparatus that performs recording by ejecting or discharging another fluid other than ink (including a liquid, a liquid body in which particles of the functional material are dispersed or mixed in a liquid, a fluid body such as a gel, a solid that can be injected by flowing as a fluid). For example, the recording apparatus 11 may be a fluid ejecting apparatus that performs recording by ejecting a liquid body containing dispersed or dissolved materials such as electrode material and color material (pixel material) used for production or the like of liquid crystal display, electroluminescence (EL) display, or surface emitting display. In addition, the recording apparatus 11 may be a fluid ejecting apparatus that ejects a fluid body such as a gel (for example, a physical gel), a powdery particle ejecting apparatus (such as toner jet type recording apparatus) that ejects a solid, such as a powder (granular material) may be used. The present invention can be applied to any one of the fluid ejecting apparatuses. In the present specification, the term "fluid" means, for example, a liquid (including inorganic solvent, organic solvent, solution, liquid resin, liquid metal (metal melt), or the like), a liquid body, a fluid body, a granular body (including granular body and powder body) and the like.

This application claims priority under 35 U.S.C. § 119 to Japanese Patent Application No. 2017-059257, filed Mar. 24, 2017. The entire disclosure of Japanese Patent Application No. 2017-059257 is hereby incorporated herein by reference.

What is claimed is:

1. A cutting mechanism comprising:
a cutter blade that is configured to cut a medium;
a cutter unit to which the cutter blade is attached;
a pinion gear that is rotatably attached to the cutter unit, and
a rack gear that is configured to mesh with the pinion gear,
wherein the pinion gear and the rack gear are helical gears with inclined teeth, and
wherein the cutter unit moves while the pinion gear is rotated in a state of meshing the pinion gear and the rack gear.

2. The cutting mechanism according to claim 1, wherein the cutter blade is rotatably attached to the cutter unit and is rotated as the pinion gear is rotated.

3. The cutting mechanism according to claim 2, further comprising:
a relay gear that transmits rotation of the pinion gear to the cutter blade.

4. A recording apparatus comprising:
a recording unit that records an image on a medium; and
the cutting mechanism according to claim 3.

5. A recording apparatus comprising:
a recording unit that records an image on a medium; and
the cutting mechanism according to claim 2.

6. The cutting mechanism according to claim 1, wherein a plurality of the pinion gears are provided in the cutter unit.

7. A recording apparatus comprising:
a recording unit that records an image on a medium; and
the cutting mechanism according to claim 6.

8. A recording apparatus comprising:
a recording unit that records an image on a medium; and
the cutting mechanism according to claim 1.

9. The recording apparatus according to claim 8, further comprising:
a transport unit that transports the medium in a transport direction,
wherein the pinion gear and the rack gear are helical gears with inclined teeth so that the pinion gear is pressed by the rack gear toward an upstream side in the transport direction when the cutter unit moves along the rack gear while rotating the pinion gear so as to cut the medium, wherein the cutter unit including the cutter blade moves with the pinion gear toward an upstream side in the transport direction.

10. The recording apparatus according to claim 8, further comprising:
a transport unit that transports the medium in a transport direction,
wherein the pinion gear and the rack gear are helical gears with inclined teeth so that the pinion gear is pressed by the rack gear toward a downstream side in the transport direction when the cutter unit moves toward a home position along the rack gear after the medium is cut, wherein the cutter unit including the cutter blade moves with the pinion gear toward a downstream side in the transport direction.

11. The recording apparatus according to claim 8, wherein the recording unit has a driving unit that drives the recording unit, and
wherein the cutter unit is configured to be driven by the driving unit.

12. The recording apparatus according to claim 8, further comprising:
a driving unit for moving the cutter unit along the rack gear.

13. The cutting mechanism according to claim 1, further comprising:
a guide frame having one or more guide rollers rotatably attached thereto;
wherein the cutter unit is configured to be guided by the one or more guide rollers while being moves along the guide frame by the pinion gear being rotated in a state of meshing the pinion gear and the rack gear.

* * * * *